United States Patent
Connelly

[15] 3,656,219
[45] Apr. 18, 1972

[54] CUTTING TOOL

[72] Inventor: Eugene B. Connelly, Churchill Borough, Pa.

[73] Assignee: United States Steel Corporation

[22] Filed: Jan. 26, 1970

[21] Appl. No.: 5,750

[52] U.S. Cl. ........................................ 29/95, 82/59, 82/101
[51] Int. Cl. ............................................ B26d 1/00, B23b 5/11
[58] Field of Search .......................... 82/46, 47, 48, 70.2, 59; 29/95

[56] References Cited

UNITED STATES PATENTS

| 2,679,679 | 6/1954 | Metlier | 29/95 |
| 2,932,083 | 4/1960 | De Nicolo | 29/95 X |
| 2,979,805 | 4/1961 | Johnson | 29/95 |
| 3,131,588 | 5/1964 | McConnell | 82/48 |
| 3,276,301 | 10/1966 | Fotheringham et al. | 82/70.2 |

FOREIGN PATENTS OR APPLICATIONS

| 23,699 | 10/1897 | Great Britain | 29/95 |
| 39,890 | 8/1957 | Poland | 29/95 |

*Primary Examiner*—Harrison L. Hinson
*Attorney*—Robert J. Leek, Jr.

[57] ABSTRACT

A cutting tool is disclosed for an apparatus for cutting a crop section of pipe from the pipe at a predetermined location on the pipe. The apparatus has pipe mounting means for supporting the pipe, tool mounting means adjacent the pipe and drive means connected to one of the pipe and tool mounting means for causing relative rotary movement between the pipe and the tool mounting means. The cutting tool is mounted on the tool mounting means, is movable into cutting engagement with the pipe at the predetermined location, and is operable to create a deformed section of the pipe during the cutting operation. The cutting tool has a cutting tip provided with a pipe cutting edge and a crop cutting edge. The pipe cutting edge and the crop cutting edge intersect to form an apex. The pipe cutting edge defines with one side of the cutting tip of facing corner. The crop cutting edge defines, with the other side of the cutting tip, a crop corner. The crop corner is disposed a greater longitudinal distance from the apex than the facing corner so that the facing corner cuts through the pipe before the crop corner cuts through the crop section thereby permitting the deformed section to fall from the pipe with the crop section.

24 Claims, 11 Drawing Figures

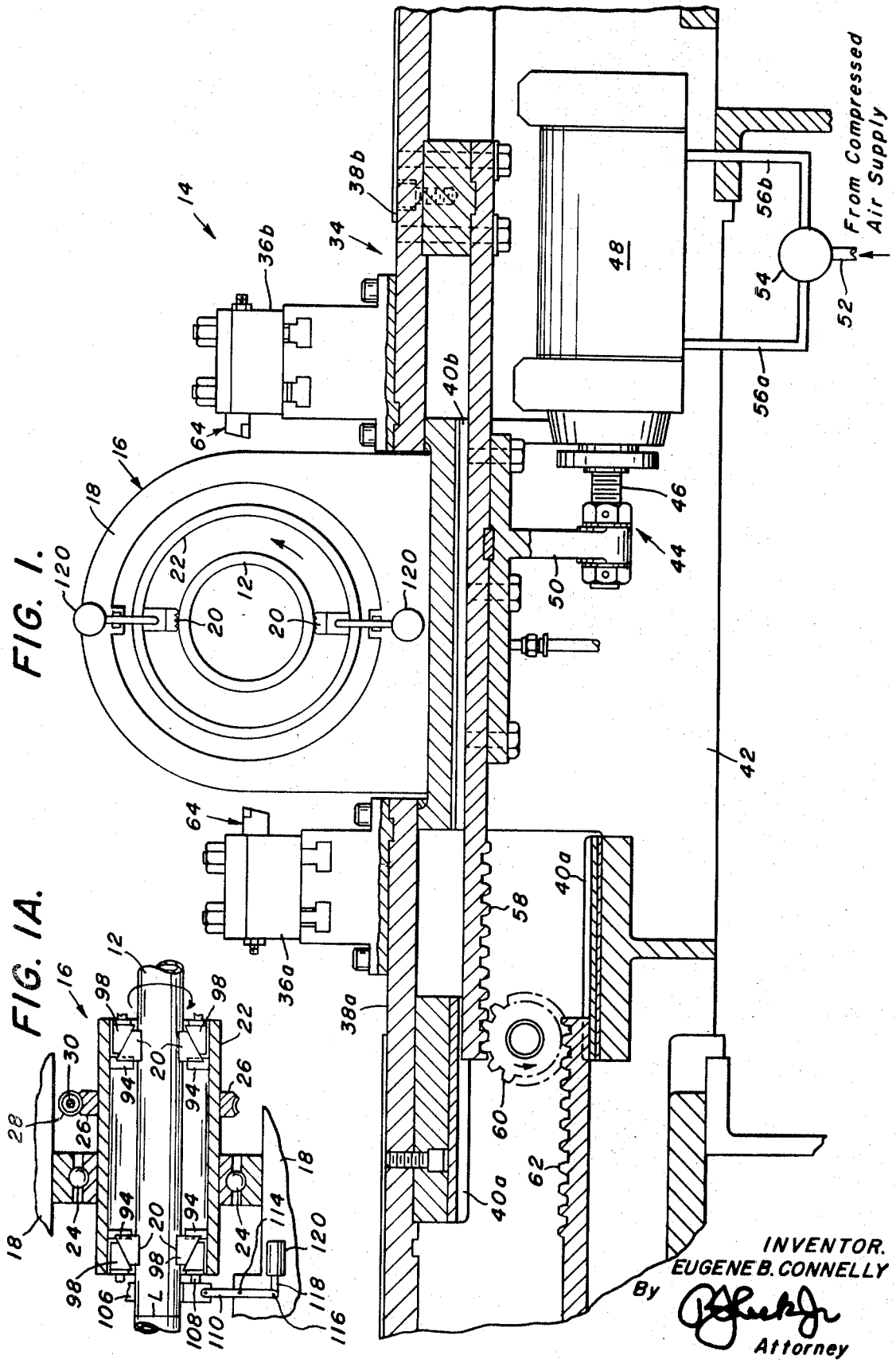

PATENTED APR 18 1972 3,656,219
SHEET 2 OF 3
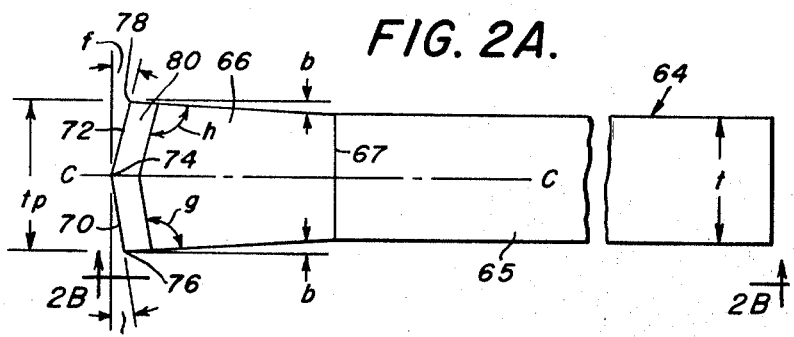
FIG. 2A.
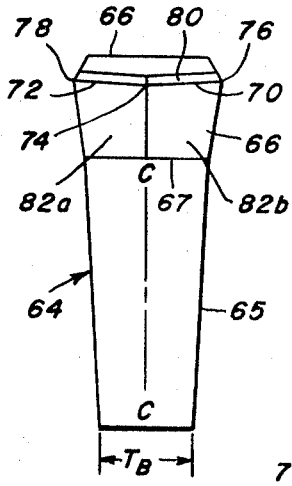
FIG. 2C.
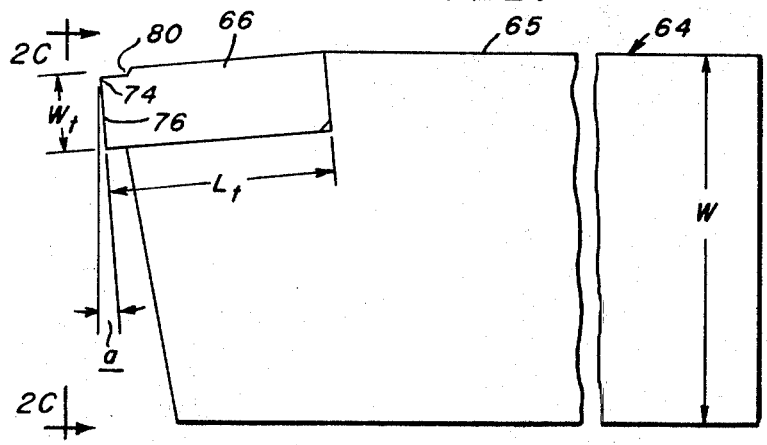
FIG. 2B.
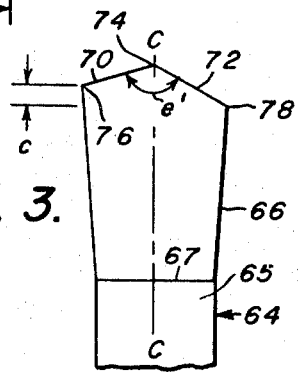
FIG. 3.
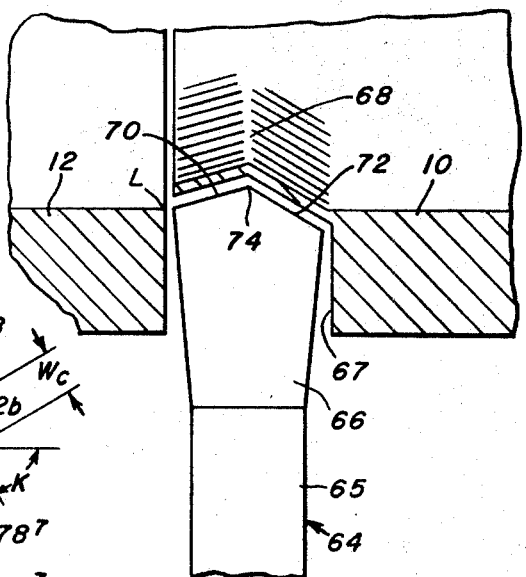
FIG. 4.
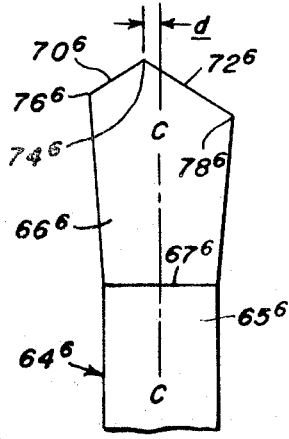
FIG. 6.
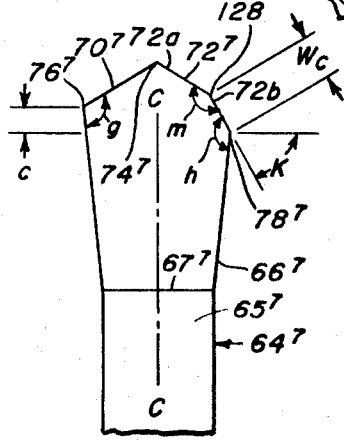
FIG. 7.
INVENTOR.
EUGENE B. CONNELLY
By 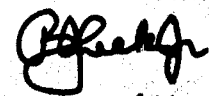
Attorney INVENTOR.
EUGENE B. CONNELLY
Attorney

CUTTING TOOL

BACKGROUND OF THE INVENTION

Heretofore, after the manufacture of a pipe, it has been necessary to remove the imperfect or crop section from each end of the pipe by means of a cutting tool. The most normally used tool is a tungsten carbide tipped tool designed to cut a narrow groove in the pipe. This narrow groove is progressively deepened and eventually passes through the wall of the pipe and separates the crop from the pipe body. During the cutting operation, a large amount of force is exerted on the tool, and since the pipe is rather ductile, the tool usually deforms the pipe wall ahead of the cutting surface. As the cutting operation progresses further, the deformed section of the pipe is actually separated from the pipe and forms a thin hoop-shaped section which springs away from the tool upon separation from the pipe and the crop portion in an unpredictable manner and often is deposited within the pipe body. The hoops, if not removed, often remain within the pipe and cause operational problems and, in any case, are difficult to remove from inside the pipe.

Conventional cutting tools are shown in the following patents:

| U.S. Pat. No. | Inventor | Issued |
| --- | --- | --- |
| 1,756,516 | Klopstock | Apr. 29, 1930 |
| 2,382,020 | Nesbitt et al. | Aug. 14, 1945 |
| 2,502,922 | Bura | Apr. 4, 1950 |
| 2,905,243 | Rodder | Sept. 22, 1959 |
| 2,936,679 | Thuerwachter | May 17, 1960 |

The Bura cutting tool disclosed in U.S. Pat. No. 2,502,922 shows an angular difference between the two cutting edges of at least about 60° thereby creating a side thrust toward the crop corner sufficient to bend the tool shank. As a result, a larger width tool shank is required, increased horsepower for cutting is needed and additional workpiece material will be removed, during the cutting operation, as chips and the like.

The Klopstock cutting tool disclosed in U.S. Pat. No. 1,756,516 displaces the point of intersection of the cutting edges toward the lesser angled cutting edge and provides a difference in the angle of the two cutting edges of about 30°. These characteristics create an undesirable sideways bending force on the shank of the cutting tool and accentuate the unbalance of the forces created by the substantially angular difference between the cutting edges of the cutting tool.

OBJECTS OF THE INVENTION

It is the general object of this invention to avoid and overcome the foregoing and other difficulties of and objections to prior art practices by the provision of an improved cutting tool for removing a crop section from a hollow member such as a pipe, which improved cutting tool:

a. eliminates the formation of hoop shaped sections during the crop removal operation;

b. minimizes resultant sideways bending strains in the cutting tool;

c. permits the use of a relatively small width tool;

d. reduces the horsepower required for cutting off the crop section;

e. reduces the amount of pipe material removed during the crop removal operation; and f. substantially eliminates side thrust and resultant bending of the cutting tool.

BRIEF SUMMARY OF THE INVENTION

The aforesaid objects of this invention, and other objects which will become apparent as the description proceeds are achieved by providing an improved cutting tool for an apparatus for cutting a crop section of pipe from the pipe at a predetermined location on the pipe. The apparatus has pipe mounting means for supporting the pipe, tool mounting means adjacent the pipe and drive means connected to one of the pipe and tool mounting means for causing relative rotary movement between the pipe and the tool mounting means. The cutting tool is mounted on the tool mounting means, is movable into cutting engagement with the pipe at the predetermined location, and is operational to create a deformed section of the pipe during the cutting operation. The cutting tool has a cutting tip provided with a pipe cutting edge and a crop cutting edge. The pipe cutting edge and the crop cutting edge intersect to form an apex. The pipe cutting edge defines with one side of the cutting tip a facing corner. The crop cutting edge defines, with the other side of the cutting tip, a crop corner. The crop corner is disposed a greater longitudinal distance from the apex than the facing corner so that the facing corner cuts through the pipe before the crop corner cuts through the crop section thereby permitting the deformed section to fall from the pipe with the crop section.

BRIEF DESCRIPTION OF THE SEVERAL VIEWS OF THE DRAWINGS

For a better understanding of this invention, reference should be had to the accompanying drawings wherein like numerals of reference indicate similar parts throughout the several views and wherein:

FIG. 1 is a side elevational view, partially in vertical section, of one embodiment of the apparatus for cutting off a crop section of a hollow article or pipe from the pipe at a predetermined location on the pipe and showing a rotatable pipe mounting means and a non-rotatable tool mounting means, which tool mounting means is reciprocable into engagement with the pipe to cut off the crop section;

FIG. 1A is a longitudinal sectional view of the rotatable pipe mounting means shown in FIG. 1 having the housing of the tool;

FIG. 2A is a longitudinal side elevational view of the cutting tool and the cutting tip looking down on the pipe cutting edge and crop cutting edge along the line 2A—2A of FIG. 1B in the direction of the arrows;

FIG. 2B is a side elevational view of the cutting tool and cutting tip taken along the line 2B—2B of FIG. 2A in the direction of the arrows;

FIG. 2C is a side elevational view of the cutting tool and the cutting tip taken along the line 2C—2C of FIG. 2B in the direction of the arrows;

FIG. 3 is an enlarged side elevational view similar to FIG. 2A of the cutting tip and a shank portion of the cutting tool;

FIG. 4 is a fragmentary side elevational view partially in section of a portion of a pipe and showing the facing corner of the cutting tip having severed the crop portion, together with the deformed portion, from the pipe;

FIG. 6 is a view similar to FIG. 3 of an alternative embodiment of the cutting tool and cutting tip and showing the apex formed by the intersection of the pipe cutting edge and the crop cutting edge displaced a predetermined distance from the longitudinal centerline of the cutting tool; and FIG. 7 is a view similar to FIGS. 3 and 6 showing another alternative embodiment of the cutting tool wherein the crop cutting edge is provided with a bending corner intermediate between the apex and the crop cutting corner.

Although the principles of this invention are broadly applicable to cutting tools in general, this invention is particularly adapted for use in conjunction with a cutting tool for cutting a crop portion from a hollow member while removing (with the crop portion) the deformed section of the pipe created by the cutting tool during the cutting operation and hence it has been so illustrated and will be so described.

DETAILED DESCRIPTION

Figure 1B:
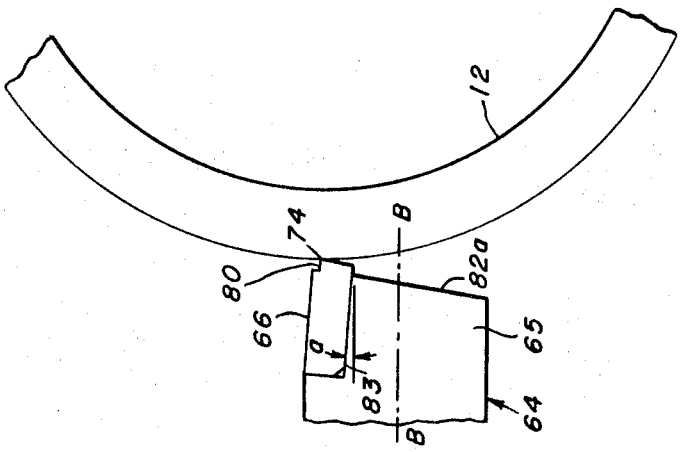
FIG. 1B is an enlarged fragmentary side elevational view showing the cutting tip of the cutting tool in cutting contact with the hollow article or pipe.

With specific reference to the form of this invention illustrated in the drawings and referring particularly to FIG. 1, an apparatus for cutting a crop section 10 (FIG. 4) of a pipe 12 (FIGS. 1,1A,1B,4,5) from the pipe 12 at a predetermined location L (FIGS. 1A,4) of the pipe 12 is indicated by the reference numeral 14.

APPARATUS 14

The apparatus 14 has a pipe mounting means 16 (FIGS. 1,1A) for supporting the pipe 12.

PIPE MOUNTING MEANS 16

The pipe mounting means 16 (FIGS. 1,1A) has a housing 18 (FIGS. 1,1A). The pipe 12 is secured centrally of the housing 18 by means of jaws 20 (FIGS. 1,1A) reciprocable with respect to a rotatable spindle 22 (FIGS. 1,1A) and the pipe 12 (FIGS. 1,1A) by the means illustrated in FIG. 5 and extending into gripping engagement with the pipe 12. In order to rotate the pipe 12 with respect to the housing 18, the spindle 22 and the jaws 20 (carried by and rotated by such spindle 22) in the direction of the arrows shown in FIG. 1A, bearings 24 (FIG. 1A) are mounted between the spindle 22 and the housing 18 and such spindle 22 is provided with a worm gear 26 (FIGS. 1A,5) engageable with a worm 28 (FIG. 5) mounted on a motor shaft 30 (FIG. 5), which motor shaft 30 is driven by a suitable motor (not shown). A reciprocable tool mounting means 34 (FIG. 1) is disposed adjacent the rotatable pipe 12.

TOOL MOUNTING MEANS 34

Such reciprocable tool mounting means 34 has a pair of opposed tool holders 36a,36b (FIG. 1) mounted on a pair of slides 38a,38b (FIG. 1) which slides 38a,38b are reciprocable in suitable dove tailed guides 40a,40b (FIG. 1) provided in a frame 42 of the reciprocable tool mounting means 34. A tool reciprocating means 44 (FIG. 1), utilized to move the slides 38a,38b toward and away from each other to cut the crop portion 10 (FIG. 4) from the pipe 12, has a piston 46 (FIG. 1) of a fluid cylinder, such as an air cylinder 48 (FIG. 1), hydraulic cylinder or the like, connected by an arm 50 (FIG. 1) to the right-hand slide 38b, as viewed in FIG. 1. A suitable supply of pressurized fluid such as air or a liquid or the like, enters an inlet line 52 (FIG. 1) from a suitable source of compressed air (not shown, but indicated by the legend "From Compressed Air Supply") through a control valve 54 (FIG. 1) and is directed as required by the desired operation of the tool mounting means 34 into appropriate branch line 56a,56b (FIGS. 1,5) by the control valve 54. In order to couple the cooperating action of the two slides 38a,38b, the right-hand slide 38b carries a rack 58 (FIG. 1) engageable with a pinion gear 60 (FIG. 1) which pinion gear 60 in turn drives a driven rack 62 (FIG. 1) on the left-hand slide 38b, as viewed in FIG. 1.

Cutting tools 64 (FIGS. 1,1B,2A–2C,3,4,5) each having a tool shank 65 (FIGS. 1B,2A–2C,4) and a cutting tip 66 (FIGS. 1B,2A–2C,4) secured to the tool shank 65, as by brazing or the like, are mounted in opposed relationship to each other on the tool holders 36a,36b.

CUTTING TOOL 64

Referring now to FIGS. 2A–2C, the cutting tool shank or cutting tool holder 65 is formed of a high silicon steel adapted to minimize the bending or flexing of the cutting tool shank or cutting tool holder 65 during the cutting operation for removing the crop portion 10 (FIG. 4) from the pipe 12.

High silicon steel, as its name indicates, is a tool steel high in silicon but also containing manganese and chromium. It has a very high elastic limit and shows good resistance to abrasion and fatigue. It has ability to absorb heavy shocks before bending or breaking. The steel has mild air hardening properties and good resistance to grain growth when heated to high temperatures. It is well adapted for punches, chisels, shear blades, rivet sets and miscellaneous types of impact tools. Its mild air hardening properties, together with its resistance to grain growth on heating to high temperatures, splendidly adapt this steel for shanks for carbide tools.

The small amount of chromium in the composition adds to its hardenability, and at the same time helps to prevent the graphitization and decarburization to which steels of this type are somewhat subject.

Its heat treatment is as follows:

Temperature for:

| | |
|---|---|
| Forging | 2,000° F to 1,600° F |
| Annealing | 1,475° F |
| Hardening in Water | 1,575° F to 1,625° F |
| Hardening in Oil | 1,625° F to 1,700° F |
| Tempering | 400° F to 500° F |

Its approximate composition is:

| | Typical | Limits |
|---|---|---|
| Carbon | 0.55% | 0.52–0.57% |
| Silicon | 2.00 | 1.80–2.20 |
| Manganese | 0.85 | 0.80–0.90 |
| Sulphur | 0.00 | 0.03 Max. |
| Phosphorus | 0.25 | 0.20–0.30 |
| Vanadium | 0.20 | 0.15–0.25 |

The cutting tip 66 is formed of tungsten carbide of the type C5 or C6 manufactured by Kennametal Inc., Latrobe, Pa. and is designed to cut a narrow groove 67 (FIG. 4) in the pipe 12 at the desired location L (FIGS. 1B,4), which narrow groove 67 is progressively deepened so that eventually the cutting tip 66 passes through the wall of the pipe 12, as shown in FIG. 4, thereby parting a deformed section 68 (FIG. 4), formed by the cutting tip 66 during the cutting operation, and causing such deformed section 68 to fall from the pipe 12 together with the crop portion 10 with attendant elimination of conventional hoops (not shown).

The cutting tip 66 (FIGS. 2A–2C,3,4) is provided with a pipe cutting edge 70 (FIGS. 2A–2C,3,4) and a crop cutting edge 72 (FIGS. 2A–2C,3,4) which pipe cutting edge 70 and crop cutting edge 72 intersect to form an apex 74 (FIGS. 2A–2C,3,4). The pipe cutting edge 70 defines with one side of the cutting tip 66 a facing corner 76 (FIGS. 2A–2C,3,4). The crop cutting edge 72 defines with the other side of the cutting tip 66 a crop corner 78 (FIGS. 2A,2C,3,4).

Adjacent the pipe cutting edge 70 and the crop cutting edge 72, the cutting tip 66 is provided with a chip breaker notch 80 (FIGS. 2A–2C) adapted to remove the chips away from the contact edges 70,72 of the cutting tip 66 with the pipe 12.

As shown in FIGS. 1B and 2C, the cutting tip 66 is provided with clearance surfaces 82a,82b behind the pipe cutting edge 70 and the crop cutting edge 72, which clearance surfaces 82a,82b extend from the apex 74 to the sides of the cutting tip 66. These clearance surfaces 82a and 82b are provided by securing the cutting tip 66 in a slot 83 (FIG. 1B) in the tool holder 65 which slot 83 is disposed at an angle $a$ equal to about 4° ± about 1° (FIGS. 1B,2C), with respect to the longitudinal axis BB (FIG. 1B) of the tool holder 65, and insure that only the pipe cutting edge 70 and the crop cutting edge 72 and the facing corner 76 and the crop corner 78 are engageable with or cut into the pipe 12.

The crop corner 78 is disposed a greater longitudinal distance $c$ (FIG. 3) from the apex 74 than the facing corner 76 so that the facing corner 76 cuts through the pipe 12, as shown in FIG. 4, before the crop corner 78 cuts through the crop section 10 thereby permitting the deformed section 68 (formed by the cutting movement of the cutting tip 66 during the cutting operation) to fall from the pipe 12 with the crop section 10 and thereby eliminate the formation of any hoop sections (not shown) during the cutting operation. The distance $c$ is in the range of about 0.020 to about 0.040 inch. In FIGS. 2A,2C,3 the apex 74 is disposed on the longitudinal centerline C—C of the shank 65.

Referring now to FIGS. 2A–2C and FIG. 3, the sides of the cutting tip 66 taper inwardly toward the cutting tool 64 from the crop corner 78 and the facing corner 76 at a back draft angle $b$ (FIG. 2A) of about 2½° thereby facilitating the removal of the cutting chips from the pipe 12, preventing the noncutting portions of the tool tip 66 from contacting the pipe 12 and generating heat, which heat might tend to melt the brazed joint 67 (FIGS. 2A,2C,3) between the cutting tip 66 and the tool shank 65. The angle $e$ (FIG. 2A) which the cutting edge 70 makes with a normal to the longitudinal axis C—C (FIG. 2A) of the cutting tool 64 is about 10° plus about 0° and minus about 2½°. The angle $f$ (FIG. 2A) which the crop cutting edge 72 makes with normal to the longitudinal axis CC (FIG. 2A) of the cutting tool 64 is about 15° plus about 2½° and minus about 0°. The angle $e'$ (FIG. 3) is in the range of about 152½° to about 157½°.

It will be noted by a consideration of FIGS. 2A and 3 that a pipe cutting obtuse angle $g$ (FIG. 2A) formed by the tool cutting edge 70 and the side of the cutting tip 66 is about 97½° plus about 0° and minus about 2½°. In turn, a crop cutting angle $h$ (FIG. 2A) which the crop cutting edge 72 makes with the other side of the cutting tip 66 is larger than the angle $g$ and is about 102½° plus about 2½° and minus about 0°. The angle $g$ being smaller than the angle $h$ permits the facing corner 76 to cut through the pipe 12 more rapidly than the crop corner 78.

The cutting tool shank 65 has a thickness $t$ (FIG. 2A) of about seven-sixteenths inch and a width $w$ (FIG. 2B) of about 1¼ inch. The cutting tip 66 has a top thickness $t_p$ (FIG. 2A) of about one-half inch, a bottom thickness $t_b$ (FIG. 2C) of about five-sixteenths inch, a width $w_t$ (FIG. 2B) of about one-fourth inch and a length $L_t$ (FIG. 2B) of about three-fourths inch.

ALTERNATIVE EMBODIMENTS

It will be understood by those skilled in the art that alternatively an apparatus $14^5$ (FIG. 5) may be employed for cutting the crop section 10 from the pipe 12. In the apparatus $14^5$ (FIG. 5) the pipe 12 is held stationary by the pipe mounting means $16^5$ and the cutting tools 64 and the tool mounting means $34^5$ are rotated about the stationary pipe 12.

Figure 5:
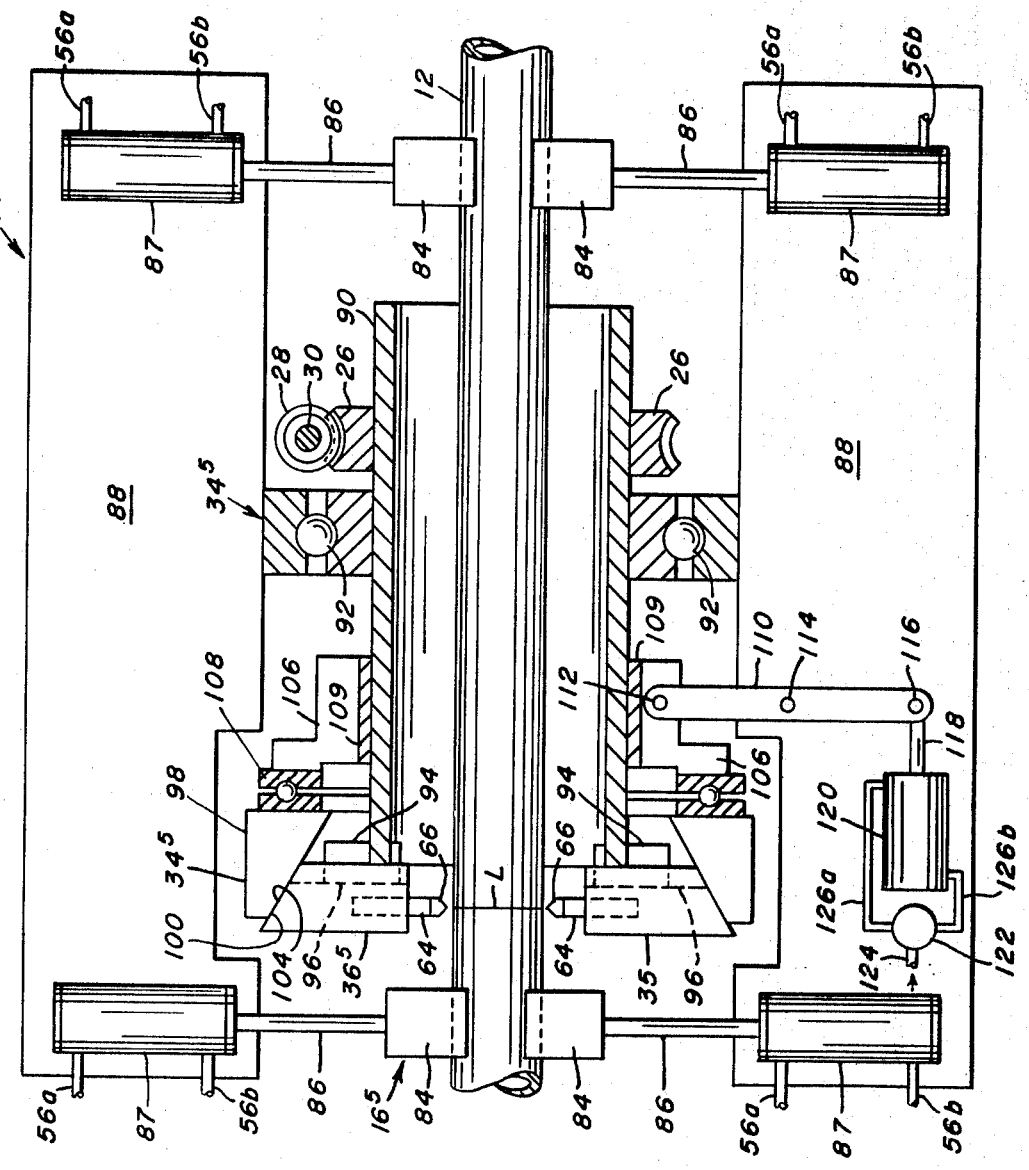
FIG. 5 is a view similar to FIG. 1A of an alternative embodiment of the apparatus for cutting the crop section from the pipe and showing the pipe held in stationary chuck jaws and a rotary tool mounting means.

In FIG. 5 the stationary pipe mounting means $16^5$ has a plurality of jaws 84 (FIG. 5) disposed in gripping engagement with the pipe 12. Each jaw 84 is urged into such gripping engagement by an associated piston 86 of a fluid cylinder 87 mounted on a housing 88 of the apparatus $14^5$. The movement of the jaws 86 by the pistons 86' of the fluid cylinders, such as an air cylinder 87, hydraulic cylinders or the like, is controlled by valves, (not shown) and inlet lines 56a,56b which are similar to the valve 54 and lines 52,56a,56b shown in FIG. 1.

The tool mounting means $34^5$ (FIG. 5) has a spindle 90 mounted rotatably by means of bearings 92 with respect to the housing 88. Such spindle 90 carries a tool mounting plate 94 provided with a suitable dove tail guide 96 in which the tool holder $36^5$ is reciprocable toward and away from the pipe 12 to permit the cutting of the pipe 12 by the tool cutting tip 66 at the predetermined location L on the pipe 12. The means utilized to reciprocate the tool holder $36^5$ comprises a collet or ring 98 having a frusto-conical surface 100 disposed in sliding engagement with a mating frusto-conical surface 104 on the tool holder $36^5$. In addition, a drive ring 106 s connected to the collet or ring 98 by means of a thrust bearing 108 and is slidable on the spindle 90 by means of a sleeve 109, formed of brass or the like. A lever 110 is connected to the drive ring 106 at 112, is pivoted on the housing 88 at 114 and is connected at 116 to a piston 118 of a fluid or air cylinder 120. A valve 122 receives a fluid, such as compressed air or the like, from an inlet line 124 and feeds the compressed air as desired through feed lines 126a,126b to the required ends of the cylinder 120.

It will be understood further by those skilled in the art that alternatively, as shown in FIG. 6, the cutting tip $66^6$ may have its apex $74^6$ disposed a distance $d$ from the longitudinal centerline C—C of the cutting tool $64^6$ to provide the required distance $c$ at which the crop corner $78^6$ is disposed below the facing corner $76^6$. The distance $d$ is less than about one-half the distance from the apex 74 to the facing corner 76.

Further, in FIG. 7, the apex $74^7$ is centered on the centerline C—C and the cutting tip $66^7$ has a crop cutting edge $72^7$, which edge $72^7$ is provided with a bending corner 128 adapted to further bend the deformed portion 68 (FIG. 4) during the bending operation. The crop cutting edge $72^7$ has a first crop cutting portion 72a extending between the apex $74^7$ and the bending corner 128 and a second crop cutting portion 72b extending between the bending corner 128 and the crop cutting corner $78^7$. The second crop cutting portion 72b is disposed at an angle K with respect to the first crop cutting portion 72a and has a narrow width $W_t$ to produce the distance $c$. The angle K is about 25° plus about 5° and minus about 5°. The bending angle $m$ (FIG. 7) is slightly less than about 170° and is greater than angles $g$ and $h$.

SUMMARY OF THE ACHIEVEMENTS OF THE OBJECTS OF THE INVENTION

It will be recognized by those skilled in the art that the objects of this invention have been achieved by providing an apparatus 14 (FIGS. 1–4) and an apparatus $14^5$ (FIG. 5) for cutting a crop section 10 (FIG. 4) from a pipe 12 at a predetermined location L (FIGS. 1A,1B,5) on the pipe 12. The apparatus cutting tools 64, $64^6$, $64^7$ eliminate the formation of hoop-shaped sections (not shown) during the crop removal operation; minimize resultant sideways bending strains in the cutting tools 64 (FIGS. 1–4), $64^6$ (FIG. 6), and $64^7$ (FIG. 7); permit the use of a relatively small thickness $t_p$ (FIG. 2A) in the cutting tools 64 (FIGS. 1–4), $64^6$ (FIG. 6) and $64^7$ (FIG. 7); reduce the horsepower required for cutting off the crop section 10; reduce the amount of pipe material removed from the pipe 12 during the crop removal operation and substantially eliminate side thrust and resultant bending of the cutting tools 64 (FIGS. 1–4), $64^6$ (FIG. 6), and $64^7$ (FIG. 7).

While in accordance with the patent statutes, preferred and alternative embodiments of this invention have been illustrated and described in detail, it is to be particularly understood that the invention is not limited thereto or thereby.

I claim:

1. A cutting tool adapted for mounting on a tool mounting means movable into cutting engagement with a pipe at a predetermined location on said pipe and operable to create a deformed section of said pipe during the cutting operation, said cutting tool having:
   a. a cutting tip provided with a pipe cutting edge and a crop cutting edge, which pipe cutting edge and crop cutting edge intersect to form an apex;
   b. said pipe cutting edge defining with one side of said cutting tip a facing corner;
   c. said crop cutting edge defining with the other side of said cutting tip a crop corner; and
   d. said crop corner being disposed a greater longitudinal distance from said apex than said facing corner so that said facing corner cuts through said pipe before said crop corner cuts through said crop section thereby permitting said deformed section to fall from said pipe with said crop section.

2. The cutting tool recited in claim 1 and being rotatable and reciprocable toward and away from cutting engagement with said pipe.

3. The cutting tool recited in claim 1 and being non-rotatable and reciprocable toward and away from cutting engagement with said pipe.

4. The cutting tool recited in claim 1 wherein said cutting tool has a shank and said cutting tip is disposed in a slot provided in said shank.

5. The cutting tool recited in claim 4 wherein said shank is formed of a high silicon steel.

6. The cutting tool recited in claim 4 wherein said cutting tip is formed of tungsten carbide.

7. The cutting tool recited in claim 4 wherein said slot is disposed at an angle to the longitudinal axis of said shank to provide clearance surfaces adjacent said pipe cutting edge and said crop cutting edge.

8. The cutting tool recited in claim 1 wherein said distance is in the range of about 0.020 to about 0.040 inch.

9. The cutting tool recited in claim 1 wherein the angle which said pipe cutting edge makes with a normal to the longitudinal centerline of said cutting tool is about 10° plus about 0° and minus about 2½°.

10. The cutting tool recited in claim 1 wherein the angle which said crop cutting edge makes with a normal to the longitudinal centerline of said cutting tool is about 15° plus about 2½° and minus about 0°.

11. The cutting tool recited in claim 1 wherein said pipe cutting edge makes a first back draft angle with one side of said cutting tip, which one side extends from said facing corner.

12. The cutting tool recited in claim 1 wherein said crop cutting edge makes a second back draft angle with one side of said cutting tip, which one side extends from said crop corner.

13. The cutting tool recited in claim 1 wherein said cutting tip is provided with a chip breaker notch.

14. The cutting tool recited in claim 1 wherein said apex is disposed substantially on the longitudinal centerline of said cutting tool.

15. The cutting tool recited in claim 1 wherein the pipe cutting angle which said pipe cutting edge makes with one side of said cutting tip is less than the crop cutting angle which said crop cutting edge makes with the other side of said cutting tip.

16. The cutting tool recited in claim 15 wherein said pipe cutting angle is about 97½° plus about 0° and minus about 2½°.

17. The cutting tool recited in claim 15 wherein said crop cutting angle is about 102½° plus about 2½° and minus about 0°.

18. The cutting tool recited in claim 11 wherein said first back draft angle is about 2½°.

19. The cutting tool recited in claim 12 wherein said second back draft angle is about 2½°.

20. The cutting tool recited in claim 1 wherein said apex is spaced a predetermined distance from the longitudinal centerline of said cutting tip.

21. The cutting tool recited in claim 1 wherein said crop cutting edge has a bending corner intermediate said apex and said crop cutting corner.

22. The cutting tool recited in claim 1 wherein said crop cutting edge has a first crop cutting portion and a second crop cutting portion and said first crop cutting portion and said second crop portion define a bending angle.

23. The cutting tool recited in claim 22 wherein said bending angle is greater than the pipe cutting angle defined by said pipe cutting edge and an adjacent side of said cutting tip.

24. The cutting tool recited in claim 22 wherein said bending angle is greater than the crop cutting angle defined by said crop cutting edge and an adjacent side of said cutting tip.

* * * * *